United States Patent [19]

Bowers et al.

[11] Patent Number: 5,170,188
[45] Date of Patent: Dec. 8, 1992

[54] CONTROL SYSTEM FOR ION PROJECTION PRINTING AND THE LIKE

[75] Inventors: John H. Bowers, Clarksburg, N.J.; Robert H. Dunphy, Holland, Pa.

[73] Assignee: Armstrong World Industries Inc., Lancaster, Pa.

[21] Appl. No.: 540,029

[22] Filed: Jun. 18, 1990

[51] Int. Cl.⁵ ............................................. G01D 15/06
[52] U.S. Cl. ..................................... 346/159; 395/108
[58] Field of Search ................ 346/155, 159; 364/518, 364/519; 395/108

[56] References Cited

U.S. PATENT DOCUMENTS

| 3,634,828 | 1/1972 | Myers et al. | 395/108 |
| 4,312,045 | 1/1982 | Jean et al. | 364/518 X |
| 4,554,637 | 11/1985 | Kuntze | 395/108 |
| 4,737,924 | 4/1988 | Miki | 395/108 |
| 4,841,313 | 6/1989 | Weimer | 346/159 |
| 4,949,105 | 8/1990 | Prowak | 346/154 |
| 4,959,791 | 9/1990 | Salisbury et al. | 364/519 |
| 4,990,942 | 2/1991 | Therrien et al. | 346/159 X |
| 4,992,807 | 2/1991 | Thomson | 346/155 |
| 5,016,195 | 5/1991 | Warp | 364/519 |

FOREIGN PATENT DOCUMENTS

| 0141880 | 5/1985 | European Pat. Off. |
| 8702451 | 4/1987 | PCT Int'l Appl. |
| 1466025 | 3/1977 | United Kingdom |
| 2023317A | 12/1979 | United Kingdom |
| 1578215 | 11/1980 | United Kingdom |
| 2070831A | 9/1981 | United Kingdom |
| 2135800A | 9/1984 | United Kingdom |
| 2152265A | 7/1985 | United Kingdom |
| 2224614A | 5/1990 | United Kingdom |
| 2230674A | 10/1990 | United Kingdom |

OTHER PUBLICATIONS

J. R. Rumsey & D. Bennwitz "Ion Printing Technology", *Journal of Imaging Technology*, vol. 12, No. 3, Jun. 1986, p. 144 et seq.
XILINX-ZC300 Logic Cell Family Product Spec. (1989).

*Primary Examiner*—George H. Miller, Jr.
*Attorney, Agent, or Firm*—M. Lukacher

[57] ABSTRACT

A print engine including a two-dimensional matrix print head is operated by data signals from a raster image processor through a distributed digital controller having a master controller and a plurality of separate controllers each for a separate set of elements along one of the dimensions of the array, specifically the finger control electrodes of an ion projection printing head. The elements along the other dimension of the array (the RF electrodes of the ion projection head) are controlled by the master controller which also controls the timing of writing of the pixel data signals into memories associated with each of the distributed controllers and the timing of the readout of the pixel data to the finger control electrodes in synchronism with the activation of the RF electrodes and the movement of a medium on which the image is printed so as to print portions of each line in sequence (interleaving dots representing pixels on each line) to form the image on the medium. The pixel data is in the form of digital grey-scale data words representing the grey scale or density of the pixels. The distributed controllers have counters which are preset by the grey-scale data words and deliver pulses of duration (a pulse width modulated output) which varies the density or grey scale of the dots.

26 Claims, 6 Drawing Sheets

CONTROL SYSTEM FOR ION PROJECTION PRINTING AND THE LIKE

DESCRIPTION

The present invention relates to a control system (method and apparatus) for distributing pixel data corresponding to the pixels of consecutive lines of an image for operating a two-dimensional matrix print head, and more particularly to a print engine including a distributed digital controller for generating pulse width modulated outputs which drive a matrix print head from a raster input data stream for printing images constituted of consecutive lines of dots of varying density or grey scale on a moveable image receptor medium.

The present invention is especially suitable for use in high speed non-impact ionographic printing in a print engine having an ion projection print head which forms a latent image of rows and columns of dots, the rows providing the lines of the image. The invention provides a distributed control architecture suitable for driving such an ion projection print head, and is also applicable for distributing pixel data signals from a raster input data stream so as to provide sequences of signals for printing two-dimensional images. The invention also facilitates the distribution of digital grey-scale data signals by means of which printing can be carried out in accordance with a grey scale or with variable density.

Ion projection printing, which is also known as ion deposition printing, utilizes ion projection heads or cartridges having a multiplicity of sets of control electrodes, with sets typically arranged orthogonally to each other, so as to enable multiplexed operation. For example, one type of ion projection head has a first set of RF electrodes which are selectively driven with high voltage RF signals to generate plasmas. Ions or electrons are projected from these plasmas under control of a second set of finger electrodes, approximately orthogonally oriented to the RF electrodes, which enable dots of charge to be deposited on a dielectric surface (a printing medium) in lines at extremely high speed (sufficient to generate hundreds of pages per minute of images). The design of such heads and their application in ion projection printing is the subject matter of an article by J. R. Rumsey and D. Bennwitz entitled "Ion printing Technology" which appeared in the Journal of Imaging Technology, Vol. 12, No. 3, Jun. 1986, pages 144 et seq. An alternate ion projection printing head uses a separate ion generator, such as a conventional DC corona or a self limiting discharge ion generator driven with a high voltage RF signals, a first set of control electrodes oriented in a preferred direction and a second set of control electrodes oriented approximately orthogonally to the first. Ions or electrons are projected from the ion source through holes at the intersection of the first and second electrodes which enable dots of charge to be deposited on a dielectric surface (a printing medium) in lines. The design of such heads and their application in ion projection printing is disclosed in Fotland, World Patent WO 87/02451.

The layout of the control electrodes, e.g., RF electrodes and finger electrodes, of a typical ion projection head is shown in FIG. 2. The head forms, at the intersection of the first and second electrodes, an array of holes, each of which is a potential ion projection source. The holes at the intersections of the first and second electrodes define ion current sources that can charge dots on a dielectric surface. The first electrodes are disposed perpendicular to the direction of movement of the printing medium, i.e., across the width of the medium. The ion current sources are grouped along the second electrodes which are each skewed at a small acute angle with respect to perpendicular to the first electrodes. The angle of skew of the second electrodes is determined by the relative spacing of the holes in the two axes. The exemplary head shown in FIG. 2 has 20 (twenty) RF (first) electrodes which, because of manufacturing limitations are not spaced at one dot position distances, but are separated by a plurality of dot position distances. In a particular system where the dot position distances are 1/300th of an inch, the RF electrodes are four dot position distances apart. The finger (second) electrodes, also because of manufacturing considerations, are also spaced apart by a distance of more than one dot position distance. In the illustrated head there are 128 finger electrodes and they are spaced 20 dot position distances apart.

This arrangement of the RF and finger electrodes enables multiplexed operation of the head thereby reducing the number of contacts that must be made to it and the number of circuits needed to drive it.

This arrangement of the RF (first) and finger (second) electrodes precludes the linear or consecutive activation of the finger electrodes by successive pixel grey-scale data words of a raster input data stream which is provided by a conventional raster image processor. Reordering of the pixel grey-scale data words becomes necessary in order for dots corresponding to the pixels to be interleaved so as to form imagewise image lines and image areas. Conventional techniques for handling the pixel grey-scale words are disadvantageous due to the need for an additional reordering step or process to occur prior to the distribution of the pixel data to the finger electrodes. This reordering step or process is either accomplished by software on a computer or hardware. If this step or process is accomplished in software, the speed of the printer will be limited to the rate at which the software can perform the reordering. If it is accomplished by hardware, extra circuitry to perform the reordering function must be designed, and the access speed requirements to random access memory will be at least twice the speed at which the pixel data is generated by the raster image processor. This increases the cost of implementation of an ionographic print engine. Also, design of the reordering step or process is dependent upon the specific configuration of the ion head, i.e., the number of RF (first) and finger (second) electrodes, thereby making difficult or impractical expansion of the width of the image (by using more finger electrodes and longer RF electrodes) without substantial redesign of the reordering step or process.

Conventionally, in order to accomplish distribution of the pixel grey-scale data to the finger electrodes, the raster input data is processed using a hardware ordering circuit incorporating random access memory and is subsequently input serially into a high speed (5–20 MHz clock rate) shift register. Parallel outputs from this register are loaded into second registers which drive the finger electrodes of the ion projection head. The second register provides temporary storage and incorporates buffers that operate at high voltage (e.g., 300 Vpp). It will be apparent that complex logic providing a separate data stream for each finger electrode is needed to reorder the pixel data prior to inputting the pixel data to the high speed serial shift register. The size of the random access memory used in reordering must be at least large enough to contain all of the pixels that are under the area of the ion projection head, e.g., for an 8" wide head comprising 20 RF electrodes and 124 finger electrodes with RF electrode spacing of 4 pixels, (20×124)×(20 ×4)=198,400 storage locations are needed. Access rates to random access memory will be approximately 18 mega-accesses per second at a printing speed of 60 feet per minute. Expandability for wider heads cannot be accomplished without substantially redesigning the reordering circuit and increasing the speed of access to the memory. For example, a 14" head would require another 86 finger electrodes for a total of 210 finger electrodes, thereby requiring 336,000 storage locations in the random access memory required for reordering and approximately 70% faster access rates. Access rates to random access memory must increase to at least 30 mega-accesses per second for the same printing speed. It is apparent that further expansion of width or increase of speed requires such additional complication of the random access memory system so as to make impractical the use of this approach in moderate to low cost ionographic printers.

Grey scale or density control may be obtained by varying the interval of time during which the finger electrode which deposits a dot is activated; the length of time determining the number of ion pulses (each from a successive cycle of the RF voltage applied to the RF line electrodes) which is deposited on the dielectric surface to form a dot of the latent image. See U.S. Pat. No. 4,841,313 issued Jun. 20, 1989. It is, therefore, necessary to convert each word-wide data signal into an activating pulse for the appropriate finger electrode which is modulated in width corresponding to the value of the word. The handling of word-wide data signals to obtain grey scale or density variations in the dots of the image, therefore, still further complicates the requirements for data handling and control.

It is the principal object of the present invention to provide an improved data management and control system (method and apparatus) whereby pixel data from a raster input data stream can be distributed to a printing head having a plurality of control electrodes arranged across the width of a medium on which printing is to be accomplished, such for example as in a two-dimensional matrix and particularly the matrix of electrodes of an ion projection printing head.

It is a further object of the present invention to provide an improved system (method and apparatus) having a distributed control architecture which accommodates a serial input data stream, such as the sequential pixel data stream from a raster image processor, and generates control signals for operating a multi-electrode matrix printing head.

It is a still further object of the present invention to provide an improved control system (method and apparatus) having a distributed electronic control architecture which distributes a serial data stream such as delivered by a raster image processor and generates pulse width modulated outputs for operating the electrodes of a multi-electrode printing head, such as the electrodes of an ion projection cartridge whereby to print an image constituted of dots having variable density or grey scale.

It is a still further object of the present invention to provide an improved control system having a distributed electronic control architecture which reorders a serial data stream, such as the sequential pixel data signal stream from a raster image processor and drives a two-dimensional printing head, such as an ion projection head, so that the dots which are associated with the same line and are printed at different times are printed in interleaved relationship with each other and wherein complexity of electronic hardware is minimized.

Briefly described, a print engine embodying the invention is operative for printing on a moving medium an image constituted of lines of dots corresponding to lines of pixels of the image. These pixels are derived from raster data signals which represent consecutive pixels of consecutive lines of the image. The print engine utilizes a printing head having a matrix of transversely disposed electrodes corresponding respectively to a plurality of the lines and to a plurality of the dots of the lines. Means are provided for distributing the raster data signals into a plurality of groups corresponding to different groups of the pixels in the lines and also for operating different groups of the electrodes which correspond to the dots and to different ones of the lines to consecutively print different portions of the lines of at least part of the image until the image is printed on the medium as it moves with respect to the head in a direction transverse to the electrodes corresponding to the plurality of lines. The distributing means is provided by a distributed electronic control architecture having a plurality of first controllers each for a different set of the electrodes associated with the dots of the lines. A master controller activates the electrodes associated with the lines. The master controller also controls the writing into separate data storage memories which are associated with each of the first controllers and synchronizes the read-out of the memories with the activation of the line electrodes so as to order the data. The dots are then interleaved, although they may be printed by the simultaneous activation of different line electrodes and dot electrodes. Pulse width modulated outputs for grey scale or density control are obtained by storing word-wide pixel data signals in the memories and reading them out into counters which are decremented; the interval of time to decrement or clear the counters corresponding to the width or duration of the pulse output. The grey scale or density, therefore, is directly related to the value of the words.

The foregoing and other objects, features and advantages of the invention as well as presently preferred embodiments thereof and the best mode now known for practicing the invention will become more apparent from a reading of the following description in connection with the accompanying drawings in which.

Figure 4:
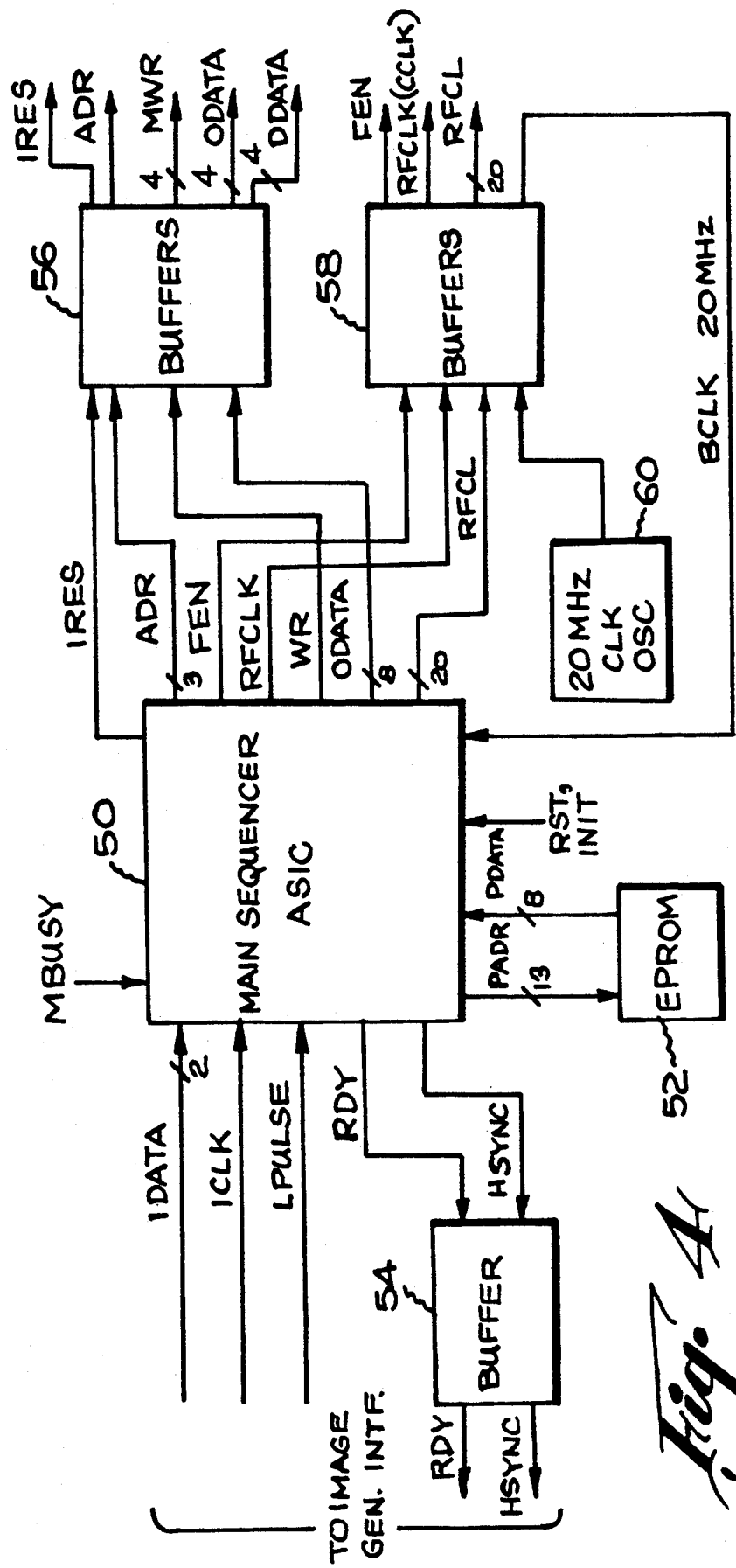
FIG. 4 is a block diagram illustrating the master controller of the distributed digital controller shown in FIG. 3.
Figure 5:
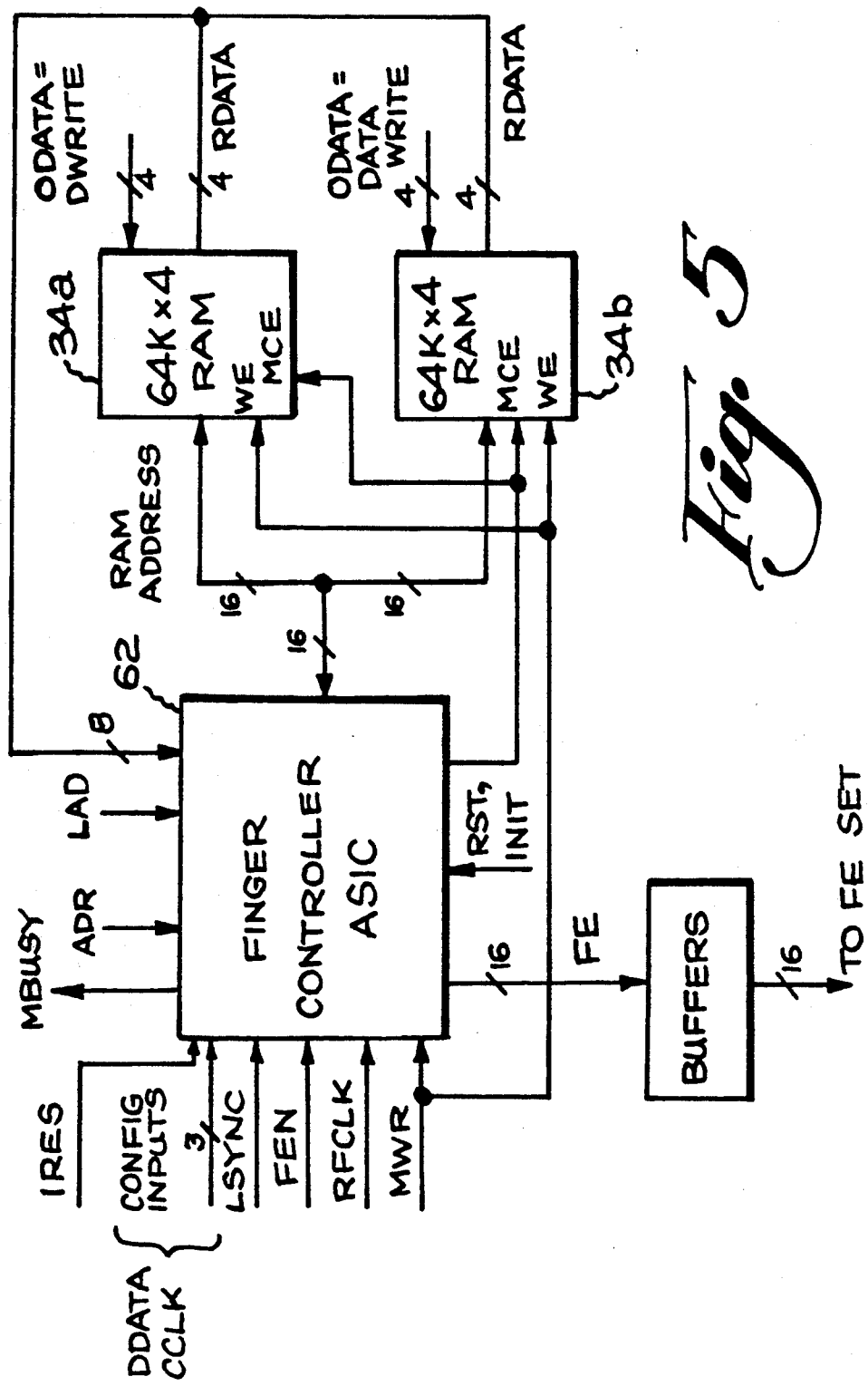
FIG. 5 is a block diagram of a typical one of the finger controllers of the distributed digital controller which is shown in FIG. 3.

Enclosed with this application is a microfilm appendix of a programmable gate array (called footprint PWM gate array) consisting of eight frames of drawings and additional frames of files setting forth the equations governing programmable array logic elements in the gate array, a XILINX XC3090PG175-70 programmable logic cell array, which constitutes the logic circuitry in FIG. 5. The microfiche also contains three frames of drawings and three frames of definitions and equations schematically showing the gate array, a XILINX XC3090PG175-70 programmable logic cell array, which constitutes the logic circuitry of the master controller (also known as master sequencer) shown in FIG. 4.

Figure 1:
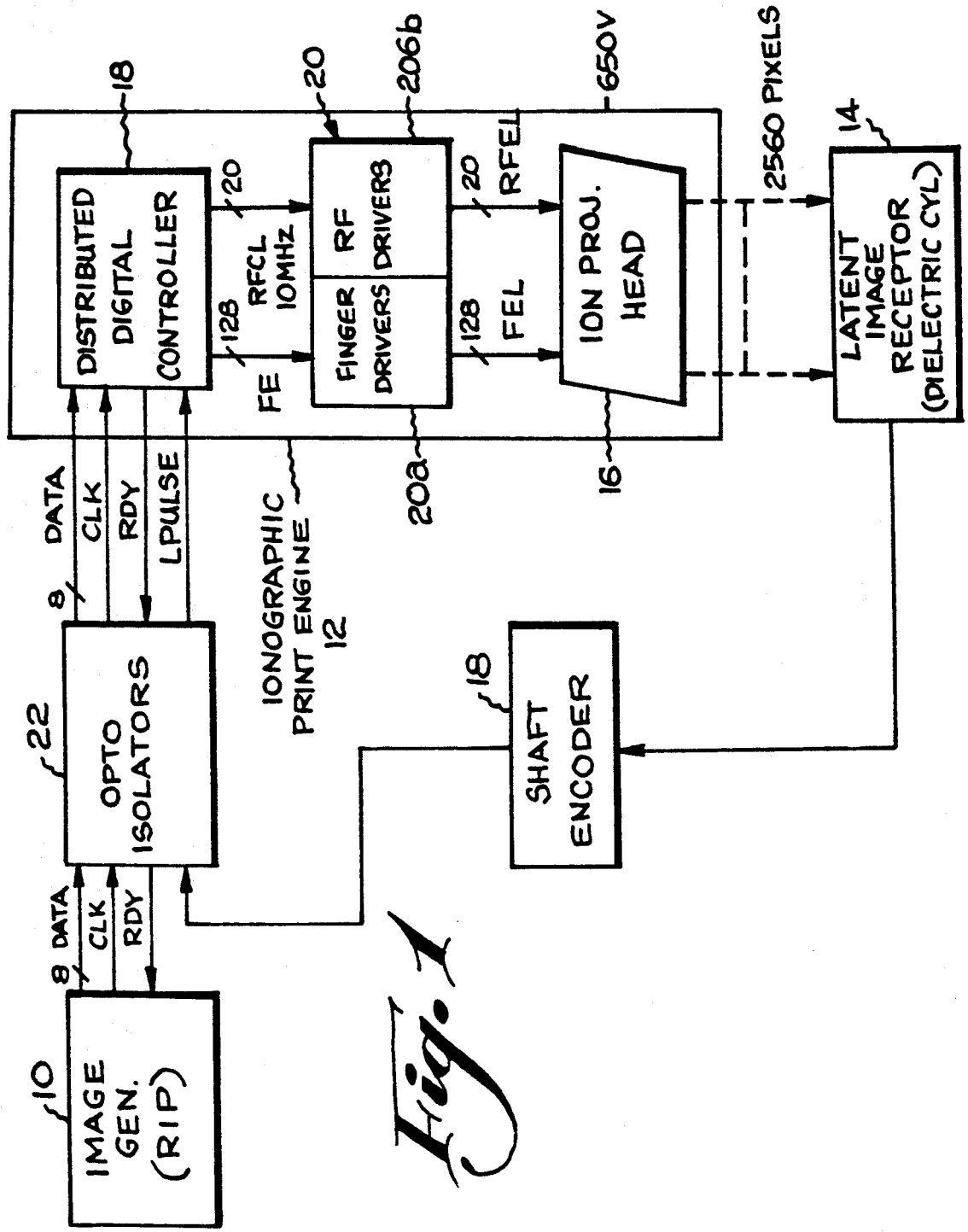
FIG. 1 is a block diagram of an ion projection printing system having an ionographic print head, employing RF electrodes, embodying the invention.

Referring first to FIG. 1, an image generator which may be a conventional raster image processor (RIP) 10 supplies the input pixel data stream to an ionographic print engine 12. In this example, the stream is 8 bits wide and consists of 2560 bytes per line. The print engine 12 and RIP 10 exchange control signals for clocking the data into the print engine (CLK), identifying the end of lines (HSYNC) and gating the transfer of data according to whether the print engine is ready to receive it (RDY). See, also FIG. 4.

The images are written on a dielectric cylinder which provides a latent image receptor 14. The cylinder is driven continuously or may be stepped by a suitable motor (not shown). The position of the cylinder with respect to the print engine, and particularly to the ion projection head 16 thereof, is known because a shaft encoder 18 provides line pulse signals (LPULSE) to the print engine when the cylinder 14 rotates a distance corresponding to the spacing of the lines of the image to be printed. Grey-scale ionographic printing is effected by controlling the duration of the activation of the finger electrode drive signals FE, thereby controlling the amount of charge deposited upon the latent image receptor 14 and the density of the resulting developed image. By interleaving the dots formed at the intersections of the 128 finger electrodes and 20 RF electrodes, such dots being formed when there is simultaneous activation of finger and RF electrodes at their intersections, dots corresponding to the 2560 pixels with varying grey scale or density are formed in interleaved relationship on each line of the image on the dielectric cylinder 14.

Figure 2:
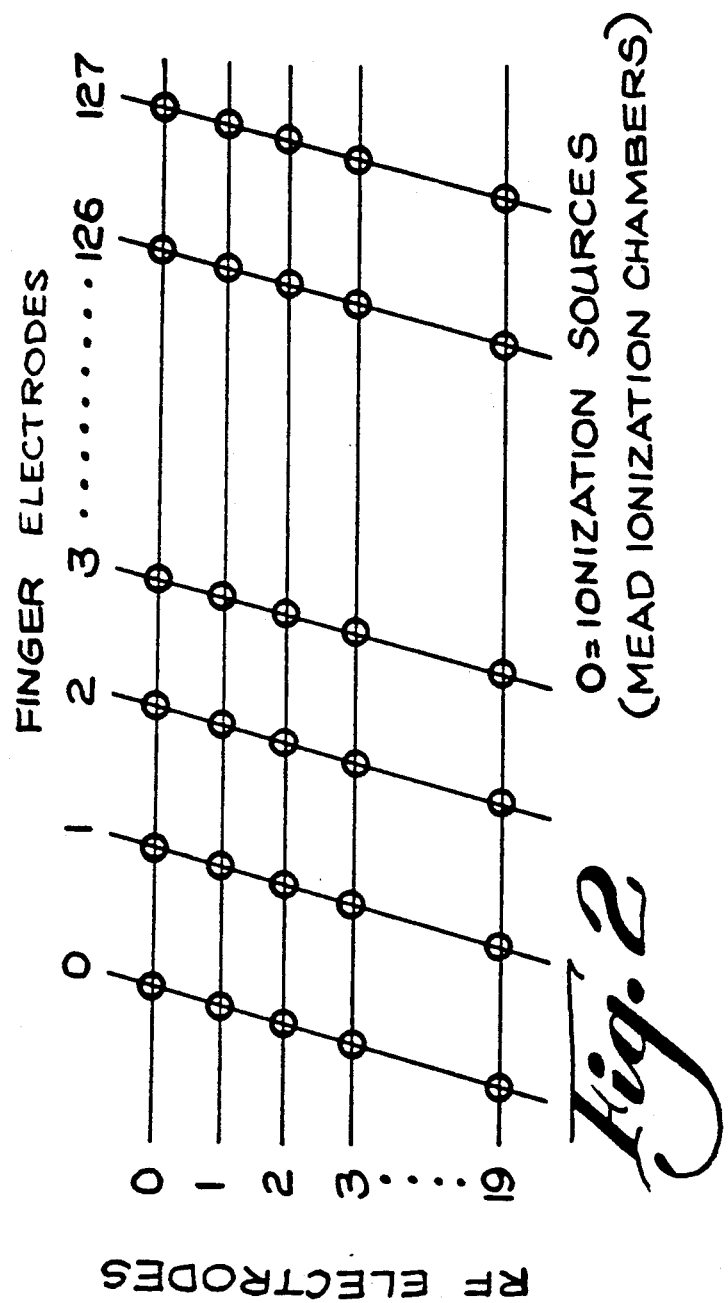
FIG. 2 is a diagram schematically illustrating the layout of the electrodes of the ion projection print head which is shown in FIG. 1.

The print engine contains, in addition to the ion projection head 16, a distributed digital controller 18 and analog driver circuits 20a, for finger electrodes, and 20b, for RF electrodes. The driver circuits 20a and 20b convert the TTL level signals output from the controller 18 into voltages sufficiently high to drive (activate or operate) the electrodes of the ion projection head 16. The ion projection head, as shown in FIG. 2, has, in this example, 128 finger electrodes and 20 RF electrodes. The finger electrode drive signals FE are typically at $-450$ volts potential when disabled (off: no ions are allowed to flow) and $-650$ volts potential when enabled (on: ions are allowed to flow). The RF electrode drive signals RFEL are, in this example, sinusoidal signals of approximately 1600 volts peak to peak and 10 MHz frequency. The finger drivers 20a are pulse amplifiers which translate TTL level signals FE generated by the distributed digital controller 18 into the previously described finger electrode control voltages with rise and fall times sufficiently fast to enable effective control of the charge deposited upon the latent image receptor 14. The RF drivers 20b may be pulse amplifiers directly translating TTL level pulse streams RFCL of 10 MHz frequency to the RF electrode drive signals previously described. Alternately, the RF drivers 20b may be oscillators capable of generating the previously described RF electrode drive signals which are enabled by TTL level signals RFCL for the duration of time that the signals are on.

The print engine 12 may in its entirety be maintained at a bias voltage of approximately $-650$ volts. Accordingly, isolation between the image generator (the RIP 10), the shaft encoder 18 and the print engine 12 is maintained by opto-isolators 22. (See FIG. 3.) The data signals and control signals which interface with the RIP 10 as well as the LPULSE signal from the shaft encoder are all coupled through the opto-isolators 22 to the print engine.

Figure 3:
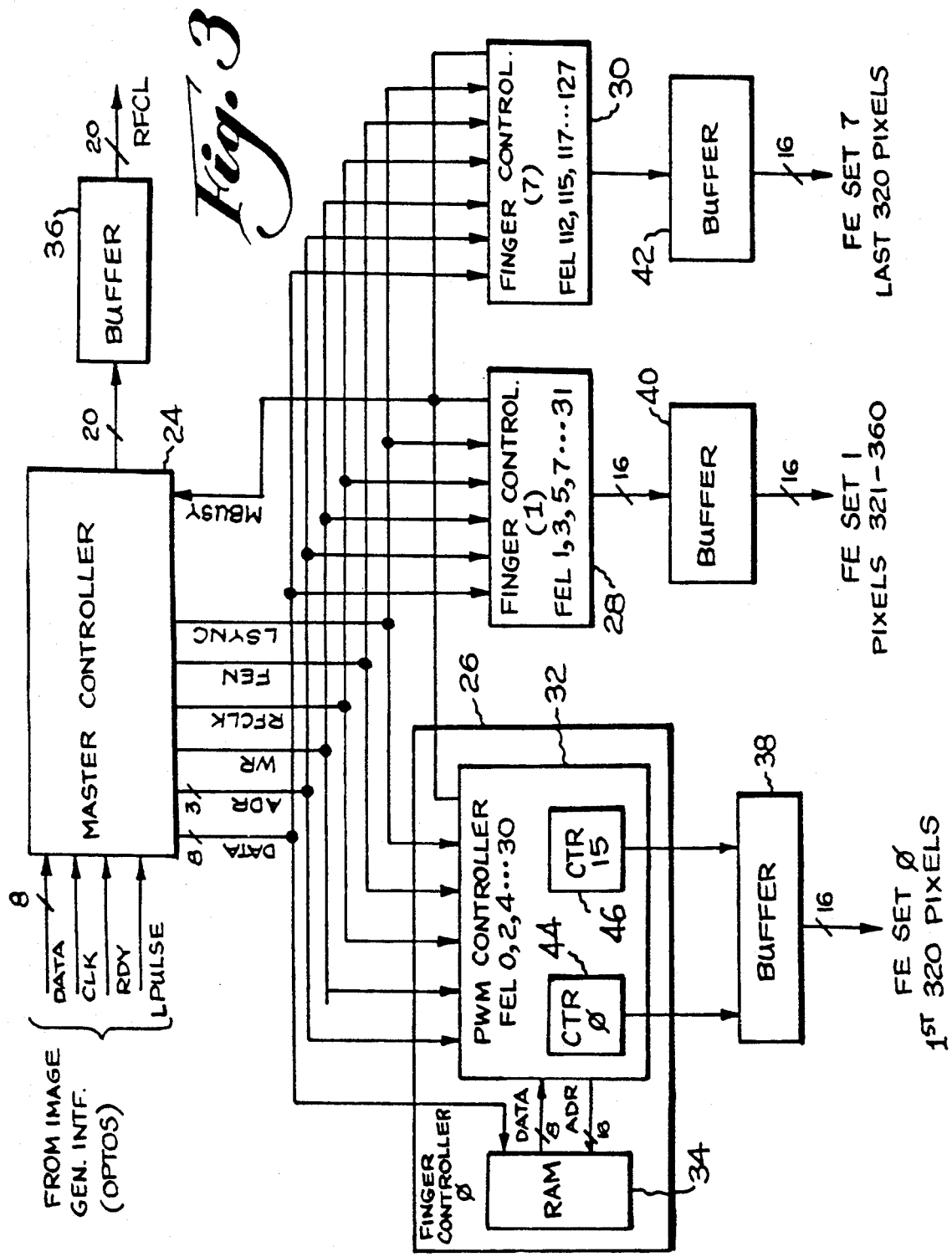
FIG. 3 is a more detailed block diagram of the distributed digital controller shown in FIG. 1.

The distributed digital controller 18 is constituted of a master controller 24 and a multiplicity of first electrode or finger controllers 26 as shown in FIG. 3. The master controller manages the interface with the image generator, distributes pixel data to the finger controllers, and controls the timing of the operation of the distributed digital controller. The finger controllers order pixel data and generate pulse width modulated finger enable signals. In this example there are 8 finger controllers, each of which controls a different set of 16 adjacent finger electrodes (FEL). Since the imagewise successive finger electrodes are alternately offset and physically extend from different sides of the head, the sets are arranged in alternate odd and even groups. The first set consists of FEL's 0, 2, 4, ... 30 of the 128 finger electrodes. The second set consists of FEL's 1, 3, 5, .. . 31. The last group consists of finger electrodes, 113, 115, 117 and each odd electrode thereafter up to 127, the last FEL of the 128. The first and second groups of finger electrodes together receive FE (finger enable) signals which correspond to the first 640 pixels of each line. The outputs of the finger controllers are sent to the finger drivers via buffers 38. Only the first, second and eighth finger controllers (26, 28 and 30) are shown in FIG. 3 to simplify the illustration.

The width of the pulses are modulated and are of 128 different durations corresponding to the 128 valid values of the grey-scale word pixel data signals in the herein described implementation of the invention. It will be understood that grey scale or variable density in 128 different levels is obtained in each dot because of the pulse width modulation control. Each finger controller has a pulse width controller 32 which provides pulse width modulation for grey scale or density control of the dots of the image.

Each finger controller has its own random access memory (RAM) 34 containing a sufficient number of locations so that pixel data corresponding to the dots printed by the finger controller can be ordered such that when the pixel data is read out from RAM into the pulse width controller, the corresponding dots will be printed in interleaved relationship as the recording medium (dielectric cylinder 14) moves between successive line positions with respect to the head 16. Only the RAM 34 and the PWM controller 32 of the first finger controller is shown in detail to simplify the illustration.

The PWM controllers 32 each have means for generating the pulse width modulated outputs to the finger electrodes in response to the grey scale pixel data as retrieved from their RAM's. These means comprise a separate presettable counter for each finger electrode controlled. In this example, since each finger controller controls 16 finger electrodes, there are 16 counters, counter 0 to counter 15. Only the first counter 44 and sixteenth counter 46 are shown to simplify the illustration. They are decremented by clock pulses corresponding to the smallest increment of charge to be deposited upon the dielectric cylinder 14, in this example, at the frequency of the RFEL signal (10 MHz). The counters are loaded (preset) on each writing cycle of the print engine and are decremented when enabled by the FEN (finger enable) signal from the master controller. The time to decrement the counters to their zero state depends upon the value loaded therein. Accordingly, pulses of different width are created and transferred to the finger electrodes so that dots with a possible 128 levels of grey or density are written on the dielectric cylinder 14.

The master controller 24 transfers pixel data from the image generator (RIP) 10 via the isolators 22 to the finger controllers via the DATA signals. Pixel data is transferred directly to the RAM of the finger controller in locations determined by address signals generated internally to the finger controller. This data is subsequently addressed and read out by the PWM controllers and loaded into the counters.

The master controller also generates, in this example, three address signals (ADR) that are sent to each of the finger controllers to select which of the finger controllers is to receive the pixel data from the image generator. The serial raster pixel data is thus distributed successively to the finger controllers. Distribution is in accordance with a linear sequence both insofar as addresses are generated in the PWM controllers of the finger controllers for writing into their respective RAM's and for the sequential organization of the raster pixel data. The master controller additionally generates a write signal (WR) that is sent to each of the finger controllers to cause the transfer of pixel data into a location of RAM in the finger controller selected by the ADR signals.

The master controller derives the LSYNC signal from the LPULSE signal and sends it to the finger controllers to synchronize the writing of lines with the movement of the dielectric cylinder 14. LSYNC sequences the address generators for writing and reading the RAM in the finger controllers such that they point to locations corresponding to the beginning of a new line of pixel data. It also causes the master controller to initiate the sequencing of the activation of the 20 RF electrodes. The master controller generates and sends to the finger controllers the RFCLK signal. This signal is used to advance the address generators for reading the RAM in the finger controllers and cause the finger controllers to read pixel data out of RAM and load it into the individual counters 44, 46 of the PWM controllers. The RFCLK signal is generated once for each of the activations of the RF electrodes and hence, in this example, 20 times for each occurrence of the LSYNC signal. After all of the counters are loaded with appropriate pixel data the master controller generates the FEN signal, the leading edge of which starts all of the counters. The data in the counters instructs each finger electrode how long it should remain inactive before allowing ions to leave the ion projection head. The trailing edge of FEN turns all of the finger electrodes off.

The master controller outputs on the 20 RFCL enabling pulses or 10 MHz pulse trains, depending upon whether the drivers are oscillators or pulse amplifiers, to the RF drivers 20b via a buffer 36 to activate the RF electrodes.

The MBUSY signal is generated by the finger controllers when data from RAM is being loaded into the counters of the PWM controller and the RAM is therefore unavailable to receive pixel data from the image generator. MBUSY is asserted to inhibit the master controller from sending any new pixel data. The MBUSY signal is used by the master controller to generate the RDY signal which gates the flow of pixel data from the image generator.

FIG. 4 shows the components used in an embodiment of the master controller. The master controller is also called the main sequencer of the distributed electronic control architecture since it times the writing and read out of pixel data. It is largely implemented in an application specific integrated circuit (ASIC) 50, in this case a programmable gate array, although EPLD, gate array, standard cell, compiled logic, full custom or other suitable implementations are feasible, the latter implementations being preferable in a product to manufactured in large numbers. In the illustrated embodiment of the invention, the programmable gate array which constitutes the main sequencer ASIC is suitably an XC3090G175-70 manufactured by XILINX. This device has an array of configurable logic blocks which are programmed by data in an electrically programmable read only memory (EPROM) 52. The EPROM is addressed by the address signals PADR which are generated in the programmable gate array 50. The configuration data for the programmable gate array is output as eight PDATA signals by the EPROM 52. The RST-INIT signal, normally asserted at start up, causes the programmable gate array to be configured from the EPROM and resets all the counters, registers and latches in the array 50.

The main sequencer ASIC 50 includes latches to implement re-timing of the pixel data signals (IDATA), and a double buffer to enable acceptance of one pixel of data from the image generator after the RDY signal is de-asserted. The RDY signal is de-asserted upon completion of transmission of one line of pixel data prior to the leading edge of LSYNC and when MBUSY is asserted. The main sequencer ASIC also generates the HSYNC signal upon completion of transmission of one line of pixel data. HSYNC is intended to increment the line counter in the image generator. Thus, in this example, when 2560 ICLK pulses are counted, corresponding to the number of pixels in a line, HSYNC and RDY are de-asserted. A buffer 54 is used to transfer these signals to the opto-isolators to ensure sufficient drive voltage and current capability.

Buffers 56 and 58 are used to transfer the control signals generated by the main sequencer ASIC to the finger controllers. The WR signal is transferred as four MWR signals which go to separate pairs of finger controllers. The pixel data is transferred first through the main sequencer ASIC and subsequently through buffers 56 and 58 to the RAM 34 in the finger controllers.

A 20 MHz oscillator 60 is used as the system clock for the master controller and is applied to the main sequencer ASIC at the clock input thereof via buffer 58.

Figure 6:
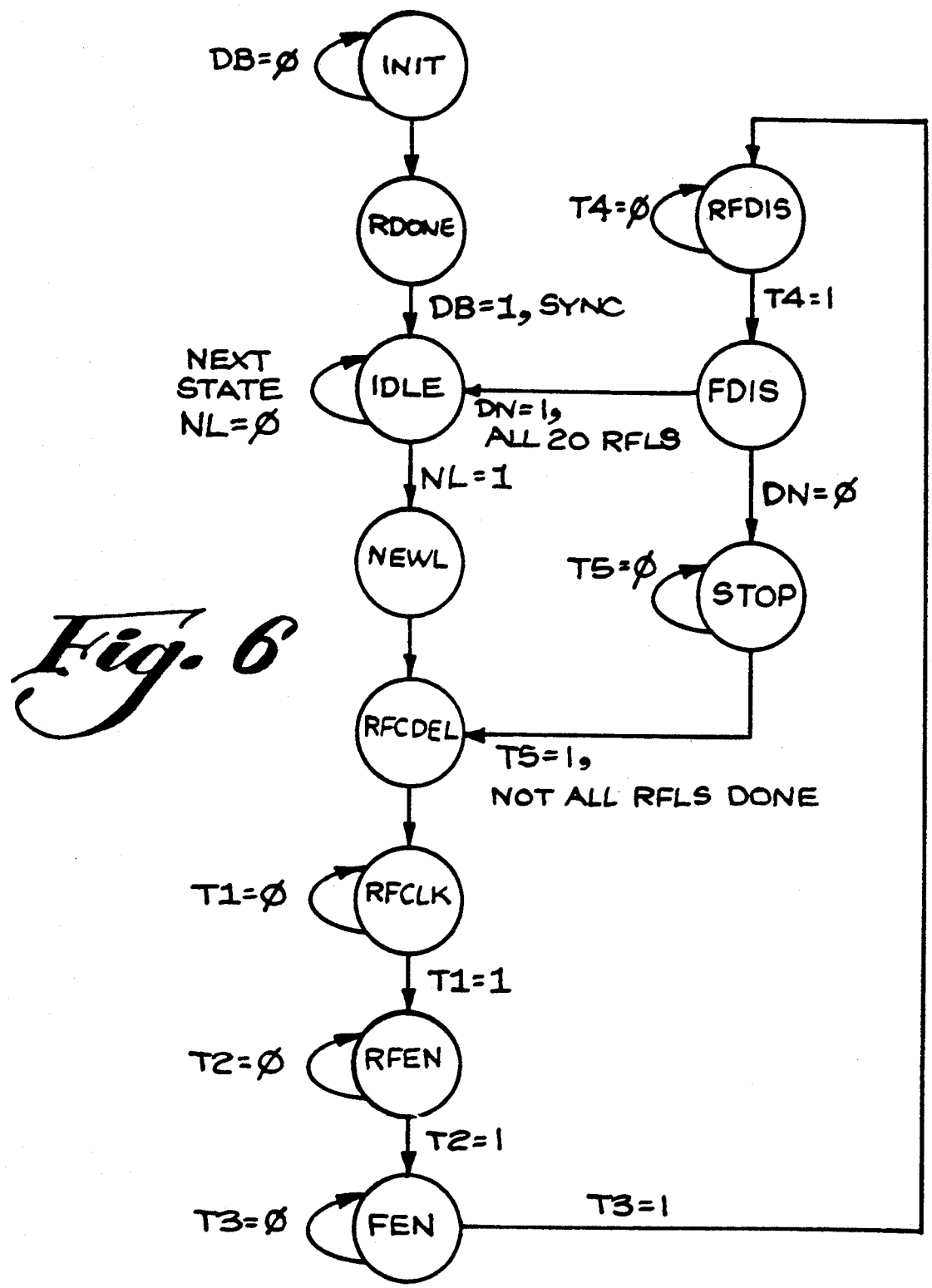
FIG. 6 is a state diagram illustrating the programming and operation of the array of the master.

The design and embodiment of the main sequencer ASIC will be more apparent from the state diagram shown in FIG. 6. The state machine diagram shows the operation of the main sequencer ASIC 50 as it relates to process of writing dots on the dielectric cylinder 14 caused by the LPULSE signal. The INIT state is entered at power up or when the RST-INIT signal is asserted. Entry to this state causes the IRES signal to be asserted by the main sequencer ASIC causing the finger controllers to reset all their counters, registers and latches. Transition to the RDONE state occurs after a pre-determined time period. The time period is decoded from the outputs of a counter in the main sequencer ASIC that is clocked by the master controller system clock, thereby asserting the internal DB signal which causes the transition from the INIT state to the RDONE state. Transition from the RDONE state to the IDLE state occurs automatically one system clock cycle after entry to the INIT state thereby de-asserting the IRES signal.

The transition from the IDLE state to the NEWL state is caused by the internal NL signal which is derived from the leading or falling edge of the LPULSE signal applied to the main sequencer ASIC. The internal NL signal indicates that the image receiving medium is in position with respect to the print head to receive a new line of dots. In other words, the dielectric cylinder has executed a displacement equal to the distance between successive lines. Transition from the NEWL state to the RFCDEL state occurs automatically one system clock cycle after entry to the NEWL state.

In the RFCDEL state the RFCLK signal is asserted by the main sequencer ASIC thereby causing the finger controllers to start loading the appropriate pixel data into the PWM controller counters 44, 46. Transition from the RFCDEL state to the RFCLK state occurs automatically one system clock cycle after entry to the RFCDEL state. The RFCLK signal de-asserted by the main sequencer ASIC upon entry to the RFCLK state.

Transition from the RFCLK state to the RFEN state is caused by the assertion of the internal signal T1 which is asserted after a pre-determined time period using the same mechanism as is used to assert the internal DB signal described previously. The time period between the RFCLK state and RFEN state is provided to enable the finger controllers to complete the loading of data into the PWM controller counters.

In the RFEN state the internal RFEN signal is asserted thereby causing the RFEL signals to be activated. Transition from the RFEN state to the FEN state is caused by the assertion of internal signal T2 which is asserted after a pre-determined time period using the same mechanism as is used to assert the internal DB and T1 signals described previously. The time period between the RFEN state and the FEN state is provided to enable the RFEL signals to reach the required amplitude.

In the FEN state the FEN signal is asserted by the main sequencer ASIC thereby causing the finger controllers to enable counting of the counters 44, 46 in the PWM controller 32. Transition from the FEN state to the RFDIS state is caused by the assertion of internal signal T3 which is asserted after a pre-determined time period using the same mechanism as is used to assert the internal DB, T1 and T2 signals described previously. The time period between the FEN state and the RFDIS state is provided to enable the charge deposition process which forms the dots.

In the RFDIS state the internal RFEN signal is de-asserted thereby causing the RFEL signals to be removed from the ion projection head. Also in this state, the RF electrode counter is incremented. Transition from the RFDIS state to the FDIS state is caused by the assertion of internal signal T4 which is asserted after a pre-determined time period using the same mechanism as is used to assert the internal DB, T1, T2 and T3 signals described previously.

In the FDIS state the FEN signal is de-asserted by the main sequencer ASIC thereby disabling the FEN signals and counting of the counters 44, 46 in the PWM controller 32. The FDIS state may be exited in one of two ways: 1. the internal signal DN is asserted thereby indicating that all 20 RF electrodes have been sequenced through and enabling the transition to the IDLE state; and 2. the internal signal DN is not asserted thereby indicating that not all 20 RF electrodes have been sequenced through and enabling the transition to the RFCDEL state. This will cause the next RF electrode to be activated and another sequence of RFCLK and FEN pulses to be output by the main sequencer ASIC 50 to the finger controllers. The internal signal DN is decoded from the RF electrode counter. Transition from the FDIS state takes place one system clock cycle after entry to the FDIS state.

The STOP state is provided so that the input pixel data stream stops before the RAMS 34 are read and to enable the RFEL signals to completely decay to a negligible amplitude. Transition from the STOP state to the RFCDEL state is caused by the assertion of internal signal T5 which is asserted after a pre-determined time period using the same mechanism as is used to assert the internal DB, T1, T2, T3 and T4 signals described previously.

The main sequencer ASIC 50 is designed such that pixel data from the image generator, when available, is continually written to the RAM associated with each finger controller, sequencing the ADR signals so as to select the appropriate finger controller to receive the pixel data. Also, the RDY signal is not asserted after one line's worth of pixel data has been written into the RAM's until the IDLE state has been entered. In other words, after having received a line of pixel data, the RDY signal is not asserted until all of the RF electrodes have been sequenced for writing at the then current position of the medium (the dielectric cylinder 14). The HSYNC signal indicates that a line's worth of data has been written into the local RAM's of the finger controllers. Data is not written into the local RAM's when the image generator 10 does not have any data to send. This can occur temporarily if the image generator has to perform some internal function such as refresh of its dynamic memory. This does not affect continuation of the writing operations. From the foregoing discussion of the state diagram and how data into the local RAM's, it will be apparent that writing of the pixel data to the local RAM's is asynchronous to the other operations of the distributed controller 18.

Additional information as to the design of the programmable gate array 50 and the definitions and equations of the programmable array logic elements thereof may be had by referring to the appropriate portions of the microfiche appendix relating thereto.

FIG. 5 shows a typical finger controller. All of the eight finger controllers are identical. Expansion of the system for longer lines of a greater number of pixels which are printed with a head having more finger electrodes is readily accomplished by adding additional finger controllers for successive pairs of sets of the finger electrodes, and increasing the number of ADR lines. This redundancy and repetition of design simplifies and improves flexibility of configuration, and enables the control system to be implemented at lower cost than prior systems. Significantly, the required random access memory bandwidth is only slightly higher than the bandwidth required to transfer the pixel data signals. Also, integrating the random access memory with the other circuits which constitute the finger controller 26 will reduce parts count and system size. These advantages are particularly important as volume of printers manufactured increases and/or the throughput of the printer is increased.

The components used in an embodiment of the finger controller are shown in FIG. 5. Similarly to the master controller, it is largely implemented in an application specific integrated circuit (ASIC) 62, in this case a programmable gate array, although EPLD, gate array, standard cell, compiled logic, full custom or other suitable implementations are feasible, the latter implementations being preferable in a product to be manufactured in large numbers and where RAM is to be incorporated in the ASIC. In the illustrated embodiment of the invention, the programmable gate array which constitutes the finger controller ASIC is suitably the same type as used in the master controller, an XC3090G175-70 manufactured by XILINX. This device has an array of configurable logic blocks which are also programmed by data in the electrically programmable read only memory (EPROM) 52. The data from the EPROM is transferred to the finger controller via the DOUT and CCLK signals which are generated by the main sequencer ASIC and sent to all of the finger controller ASIC's. The RST-INIT signal, normally asserted at start up, causes the programmable gate arrays to be configured from the EPROM and resets all the counters, registers and latches in the arrays 62. In the present embodiment RAM devices external to the finger controller ASIC are used.

The finger controller ASIC implements the 16 PWM controller counters 44, 46, read and write address generators for the local RAM and other logic required to coordinate the operation of the finger controller. The finger controller ASIC asserts the MBUSY signal, and receives and acts upon the LSYNC, FEN, RFCLK and MWR signals. In the finger controller, the MWR signal also operates as a write enable signal to the local RAM's 34a and b. The present embodiment uses RAM's which have separate data buses for data to be written (ODATA) and data to be read by the finger controller ASIC (RDATA). The ODATA signals correspond to the previously mentioned DATA signals that are sent from the master controller to each of the finger controllers whereas the RDATA signals correspond to the data that is loaded into the PWM controller counters. The MCE signal generated by the finger controller ASIC enables the operation of the local RAM. It is decoded from the ADR signals generated by the master controller and LAD signals generated locally, or enabled during any read operation of the RAM. The local LAD signals indicate the position of the finger controller along the ion projection head and are usually hardwired.

The ordering of the data is accomplished by a 16 bit wide address on the internal address lines of the finger controller which are labeled RAM-ADDRESS in FIG. 5. The address bits are allocated as follows: the first seven most significant bits indicate the line number of data allocated to 80 lines of the image (on the recording medium which is the surface of the image receptor cylinder 14). The next four bits identify the fingers of the 16 fingers to which the data is associated. These four bits are called the finger offset bits. The last five least significant bits correspond to which of the 20 RF line electrodes is associated with the data.

The following algorithms are written for an ion projection print head having 128 control electrodes which are segregated in 16 electrode sets as shown in FIG. 3. The heads also have 20 RF electrodes.

The following algorithm written in pascal and entitled "Procedure Write Image" defines the operation of the distributed digital controller, and particularly the finger controller ASIC 62 during the mode of operation thereof when data is written into the local memories 34a and 34b. The variable FCM select address corresponds to the ADR signals that select the finger controllers.

```
Procedure Write Image
var
    line_count: integer;
    pixel_count: integer;
    rf_component_of_address: 5_bits;
    odd_even: 1_bit;
    finger_offset_of_address: 4_bits;
    line_component_of_address: 7_bits;
    FCM_select_address: 4_bits;
    ram_address: 16_bits;
begin
    repeat
        line_count := line_count + 1;
        line_component_of_address := line_count mod 80;
        for pixel_count := 0 to 2559 {2560 pixels per
            line} do
        begin
            rf_component_of_address := pixel_count mod 20
                {RF lines};
            odd_even_select := (pixel_count div 20 {RF
                lines}) and 1;
            finger_offset_of_address :=
                (pixel_count div (20 {RF lines} * 2 {for
                odd/even fingers})) mod 16;
            FEM_select_address := (
                (pixel_count div
                    (20 {RF lines} * 2 {for odd/even
                    fingers} * 16 {fingers per FCM}))
                *shl 1)
                or odd_even;
            ram_address :=
                (line_component_of_address *shl 9) +
                (finger_offset_of_address *shl 5) +
                rf_component_of_address;
            write_pixel_data_into_ram(FEM_select_ad-
                dress, ram_address);
        end;
    until end_of_image;
end {write_image};
```

The following algorithm also written in Pascal and entitled "Procedure Create Image" given below defines the programming of the finger controller ASIC 62 for the reading of data to the individual PWM finger controller counters 44, 46 (FIG. 2). Each finger controller implements this algorithm separately from and in parallel with the other finger controllers.

```
Procedure Create Image
var
    line_count: integer;
    rf_number: 5_bits;
    line_component_of_address: 7_bits;
    finger_offset: 4_bits;
begin
    repeat
        line_count := line_count + 1;
        rf_number := line_count mod 20 {RF lines};
        line_component_of_address :=
            ((line_count div 20 {RF lines}) mod 4
```

-continued

Procedure Create Image

```
        {pixels between RF lines}) +
        (rf_number * 4 {pixels between RF lines});
    for finger_offset := 0 to 15 {16 fingers per
        ASIC} do
    begin
        ram_address :=
            (line_component_of_address *shl 9) +
            (finger_offset *shl 5) +
            rf_number;
        move_pixel_data_from_ram_to_counter
            (ram_address, finger_offset);
    end;
    create_pixels_for_this_rf_electrode;
    until end_of_image;
end {create_image};
```

The pixel data write sequence for a single line will be apparent from Table I.

TABLE I

WRITE ADDRESS GENERATION FOR EACH PWM

| Pixel Byte | Finger | Finger Offset | RF # | PWM Address |
|---|---|---|---|---|
| 0-19 | 0 | 0 | 0-19 | 0 |
| 20-39 | 1 | 0 | 0-19 | 1 |
| 40-59 | 2 | 1 | 0-19 | 0 |
| 60-79 | 3 | 1 | 0-19 | 1 |
| . | . | . | . | . |
| . | . | . | . | . |
| . | . | . | . | . |
| 600-619 | 30 | 15 | 0-19 | 0 |
| 620-639 | 31 | 15 | 0-19 | 1 |
| 640-659 | 32 | 0 | 0-19 | 2 |
| 660-679 | 33 | 0 | 0-19 | 3 |
| . | . | . | . | . |
| . | . | . | . | . |
| . | . | . | . | . |
| 2520-2539 | 126 | 15 | 0-19 | 6 |
| 2540-2559 | 127 | 15 | 0-19 | 7 |

Table I shows the write sequence that takes place for the transfer of one line of pixel data; thus the upper 7 bits of the local memory address is the same for all 2560 bytes shown. The finger offset and RF number are the key fields to understand. It is important to note that each finger module contains only even or odd fingers in the current implementation due to the physical construction of the ion projection head. Because there are 20 RF lines, each finger control is responsible for 20 different pixels on a line, with all 20 pixel data words in consecutive order in the raster stream. Thus, as shown in Table I, the first block of 20 consecutive pixels (0-19) are written to the finger controller 0. The next block of 20 (20-39) go to the next finger controller and because of the even/odd partitioning of the finger electrodes, they are directed to the next finger control module (1). This is done by changing the address field generated by the master controller. The third block of 20 pixels (40-59) goes back to the first finger control module (0), but since it is for the next finger, the finger offset is now set to one. This cycle continues until each of the first two finger controllers (0 and 1) have all 16 fingers written to (finger offset 0-15). At this point 2*16*20=640 pixels have been written. At this point, the next 20 pixels (640-659) are written to the third finger control module (2). The same scenario described above now continues except the control module address alternates between 2 and 3. After the next 640 pixels have been written, finger control blocks 4 and 5 are written. This pattern continues until all 128 fingers have been written to for a total of 2560 pixels in a line. This concludes the write sequence and the associated state machine lies dormant until the next pulse from the shaft encoder.

During the entire write sequence, the master controller is responsible for only driving the finger control address bus to direct a pixel to the correct finger controller. The finger controller is responsible for generating the 16 bit local memory address and for keeping track of the line number, finger offset, and current RF number during the entire process.

The manner in which the data is read from the local memories in response to the 16 bit wide addresses will be apparent from Table II.

TABLE II

READ ADDRESS GENERATION

| Line # | Finger Offset | RF # |
|---|---|---|
| 0 | 0-15 | 0 |
| 4 | 0-15 | 1 |
| 8 | 0-15 | 2 |
| . | . | . |
| . | . | . |
| . | . | . |
| 76 | 0-15 | 19 |
| 1 | 0-15 | 0 |
| 5 | 0-15 | 1 |
| 9 | 0-15 | 2 |
| . | . | . |
| . | . | . |
| . | . | . |
| 77 | 0-15 | 19 |
| 2 | 0-15 | 0 |
| . | . | . |
| . | . | . |
| . | . | . |

After the LSYNC is asserted by the master controller at the start of a line, RFCLOCK is asserted to tell the finger controllers to load all their internal counters 44, 46 with the data associated with the RF0. This requires 16 read cycles in each finger controller. Note that all of these read cycles are done in parallel in each finger controller because the read buses are private to each controller (unlike the write bus which is common). Before the read cycle begins, each finger controller asserts MEMBUSY which holds up any further writes from the master controller. When the 16 pixel read sequence is complete, MEMBUSY is de-asserted to allow writes to begin again. The master controller then issues FEN with the appropriate timing to enable the high voltage ionization process in all ionization chambers of the print head 16 associated with RF0 and initiate the pulse width control of the finger drive signals to allow the desired amount of ions to leave the ion projection head. It is important to note for each RF firing, only 1/20th of a line is printed due to the ion head construction (See FIG. 2).

After the RF0 sequence, another RFCLOCK is issued which tells the finger controllers to load the data associated with RF1 into their internal counters 44, 46. Again, MEMBUSY, RFEN and FEN are cycled. Note that during the RF1 firing, data associated with line 4 is loaded because of the 4 line spacing between the rows of RF electrodes. For the RF2 electrode, data from line 8 is loaded. This cycle continues until all 20 electrodes are fired. Data from line 76 is used for RF19. When LSYNC is next issued, the internal line counter with the finger controllers is incremented, so that the data for RF0 is pulled from line 1, RF1 gets line 5 and so on. This pattern repeats over and over with the line number being incremented once for each group of 20 RF firings. Thus it may be seen that a line of data must reside in the local buffer memory for at least 76 line prints because of the head construction.

From the foregoing description, it will be apparent that there has been provided an improved print engine for printing on a moving medium with a two-dimensional array print head and particularly with an ion projection print head. Variations and modifications of the herein described system within the scope of the invention will undoubtedly suggest themselves to those skilled in the art. For example, if higher speed printing and a larger number of finger electrodes is used, it may be desirable to use a wider data bus and split the data between different groups of finger control modules. Accordingly, the foregoing description should be taken as illustrative and not in a limiting sense.

We claim:

1. A print engine for printing on a moving media an image constituted of lines of dots corresponding to lines of pixels of said image from raster data signals which represent consecutive pixels of consecutive lines of said image, which print engine comprises a printing head having a matrix of transversely disposed electrodes corresponding respectively to a plurality of said lines and to a plurality of said dots of said lines, means for distributing said raster data signals into a plurality of groups corresponding to different groups of said pixels in said lines and for operating different groups of said electrodes which correspond to said plurality of dots and different ones of said plurality of lines to consecutively print different portions of the lines of at least part of said image until said image is printed on said medium as it moves with respect to said head in a direction transverse to the electrodes corresponding to said plurality of lines.

2. The print engine in accordance with claim 1 wherein said raster data signals are multiple bit words corresponding to the density or grey scale of said pixels of different value, said distributing means includes pulse width modulation means responsive to said data signal words for operating said electrodes which correspond to said dots for intervals of time corresponding to the value of said words.

3. The print engine in accordance with claim 1 wherein said distributing means includes a plurality of first controllers each provided for a different one of said groups of said electrodes, said first controllers each having memory means for storing said data signals corresponding to said different groups of said pixels on different ones of said lines, and a second or master controller for distributing said different pixel groups through said first controllers for storage in said memory means thereof, said second controller having means for operating different ones of said line electrodes, said first controllers having means for reading out said stored data corresponding to said different ones of said lines to operate said groups of electrodes corresponding to said dots when said line electrode corresponding thereto is operated by said line electrode operating means of said second controller.

4. The print engine according to claim 3 wherein said raster data signals are multiple bit words of value corresponding to the density or grey scale of said dots, said memory means having storage for said words and said first controllers include pulse width modulating means responsive to said stored data signals, when read out of said memory means by said reading out means, for operating said electrodes which correspond to said dots for intervals of time corresponding to the value of said words.

5. The print engine according to claim 4 wherein said pulse width modulating means of each of said first controllers comprises means providing a plurality of counters each connected to a different one of the electrodes in said groups of electrodes for which each of said first controllers is provided, means for presetting said counters with a count corresponding to a different ones said words, and means for decrementing said counters to operate said dot electrodes in said group for said intervals of time.

6. The print engine according to claim 5 wherein said line electrode operating means includes means for applying high frequency AC voltage to said electrodes, and said decrementing means comprises means for applying pulses to decrement said counter in synchronism with said high frequency voltage and at a repetition rate corresponding to the frequency of said high frequency voltage.

7. The print engine according to claim 6 wherein said first controllers are each identical and include separate first logic means, and said second controller and includes second logic means.

8. The print engine according to claim 7 wherein said first and second logic means constitute separate state machines each sequentially stepped through a plurality of states, and means for providing synchronizing signals corresponding to the position of said lines of said image on said moving media for sequencing said state machines through their said states.

9. The print engine according to claim 3 wherein said first controllers each include means for generating address signals for storing said groups of data signals in said memory and for reading said data signals out of memory.

10. The print engine according to any one of claims 1-9 wherein said printing projection printing head having a plurality of line electrodes extending the width of said image and a plurality of finger electrodes corresponding to said data and being spaced from each other along said line electrodes, said finger electrodes being skewed at an acute angle to a perpendicular to a first of said line electrodes and extending across said plurality of line electrodes.

11. The method of creating images using a matrix print which creates columns and rows of dots constituting successive lines of pixels of said image on a moving image receiving medium from digital data signals corresponding thereto which comprises distributing said pixel data signals into a plurality of groups each for a different set of said dots constituting each of said rows, and creating different groups of said dots each with a different group of said data signals.

12. The method according to claim 11 further comprising ordering said data signals in each of said groups into different sequences of the pixels corresponding thereto which when arranged in interleaved relationship constitute a separate portion of each line of said image during said creating step.

13. The method according to claim 12 wherein said ordering step is carried out by storing said data signals in said different sequences, and reading out said stored sequences when said medium and head move to positions successively displaced from each other, each displacement corresponding to the separation of consecutive ones of said rows.

14. The method according to claim 13 further comprising the step of varying the time intervals during which each of said dots are created in accordance with the density or grey scale of said pixels corresponding thereto.

15. The method according to any one of claims 11-14 wherein said matrix print head is an ion projection head having a plurality of line electrodes spaced in the direction of the columns of said dots of said image created on said medium and a plurality of finger electrodes spaced from each other in the direction of the rows of said dots of said image and skewed with respect to said line electrodes, said sets corresponding to different pluralities of said finger electrodes, and said creating step is carried out by the step of operating said different pluralities of finger electrodes in response to said ordered, distributed pixel data signals and for operating successive ones of said line electrodes in synchronism with each other.

16. The system of creating images using a matrix print head having means for creating columns and rows of dots constituting successive lines of pixels of said image on a moving image receiving medium from digital signals corresponding thereto which comprises means for distributing said pixel data signals into a plurality of groups each for a different set of said dots constituting each of said rows, and means for creating different groups of said dots each with a different group of said data signals.

17. The system according to claim 16 further comprising means for ordering said data signals in each of said groups into different sequences of the pixels corresponding thereto which when arranged in interleaved relationship constitute a separate portion different of each line of said image during operation of said creating means.

18. The system according to claim 17 wherein said ordering means includes means for storing said data signals in said different sequences, and means for reading out said stored sequences when said medium and head move to positions successively displaced from each other each displacement corresponding to the separation of consecutive ones of said rows.

19. The system according to claim 18 further comprising means for varying the time intervals during which each of said dots are created in accordance with the density or grey scale of said pixels corresponding thereto.

20. The system according to any one of claims 16-19 wherein said matrix print head is an ion projection head having a plurality of line electrodes spaced in the direction of the rows columns of said dots of said image created on said medium and a plurality of finger electrodes spaced from each other in the direction of the rows of said dots of said image and skewed with respect to said line electrodes, said sets corresponding to different plurality of said finger electrodes, and said creating means includes means for operating said different pluralities of finger electrodes in response to said ordered, distributed pixel data signals and successive ones of said line electrodes in synchronism with each other.

21. A distributed control system for arranging pixel data corresponding to adjacent pixels on successive lines of an image to be printed for operating a print head having a two-dimensional array of first and second pluralities of control elements, which comprises a plurality of first controllers for different sets of those of said control elements disposed along one dimension of said two-dimensional array, a master controller for activating those of said control elements disposed along the other dimension of said array, said master controller having means for sequentially addressing said first controllers, said first controllers each having memory for storing different sets of pixel data for said lines, means in said first controllers for storing and retrieving different pixel data corresponding to pixels on different portions of a plurality of successive lines, and means in said master controller for timing the storage of said pixel data in said first controller memories, and the timing of the retrieving of said data in synchronism with the activation of those of said control elements disposed along the other dimension of said array.

22. The system according to claim 21 further comprising means in said first controllers for activating different control elements in their respective sets, and means for addressing said memories during storage and retrieval in accordance with which of said control elements in said sets are activated for ordering said pixel data upon retrieval thereof such that adjacent pixels of said lines are retrieved when different ones of said control elements disposed along the other dimension of said array are activated.

23. The system according to claim 22 wherein said master controller has means responsive to the movement of a medium on which an image corresponding to said pixel data is formed for repeatedly operating said storage and retrieval and ordering means upon movement of said medium a distance corresponding to the distance between successive lines of said image on said medium.

24. The system according to claim 22 wherein said pixel data is in the form of multiple bit words representing the density or grey scale of the pixels corresponding thereto, said memories have storage for the words of said pixel data, and said first controllers having means for supplying pulses having durations corresponding to the value of said words to said control elements of said sets.

25. The system according to claim 24 wherein said means for supplying said pulses comprises a counter for each of said control elements of said set for said first controllers, means for presetting said counters in response to said bytes and means for clocking said counters to decrement said counters.

26. The system according to any one of claims 21-25 wherein said print head is an ion projection print head having finger electrodes providing said control electrodes disposed along said one dimension and line electrodes disposed along said other dimension.

* * * * *